April 8, 1930.  A. D. McCORMACK  1,753,866
SCREEN FOR MOTOR VEHICLES
Filed May 31, 1928
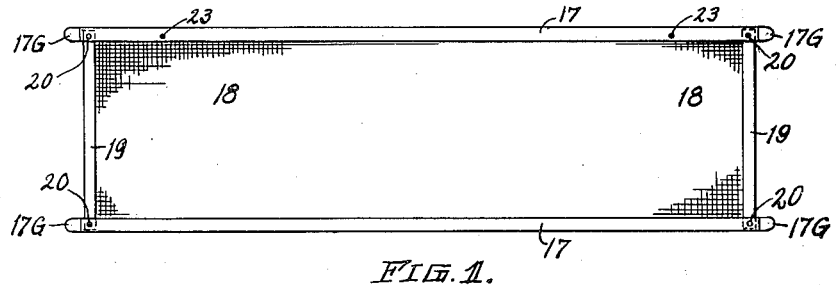
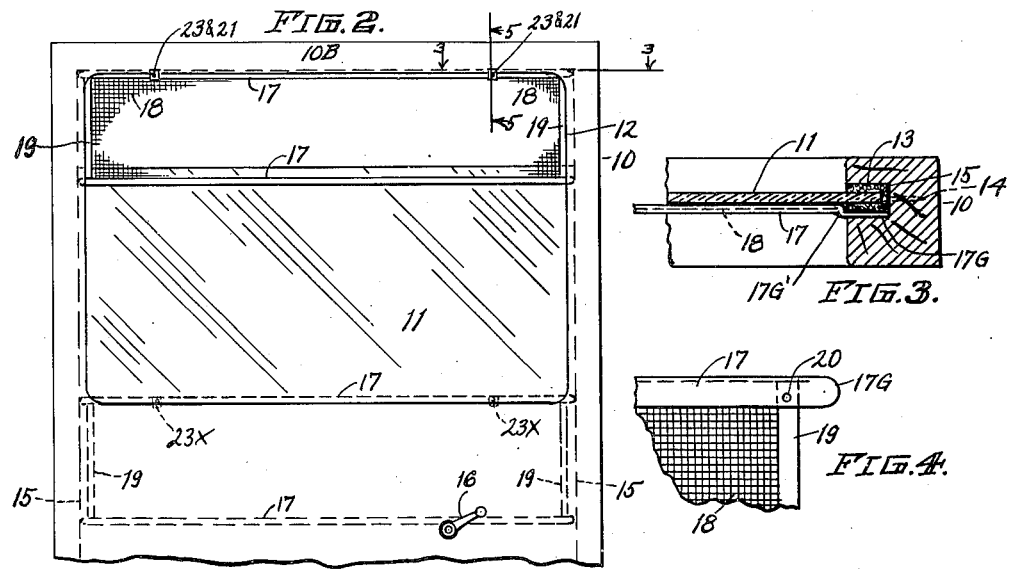
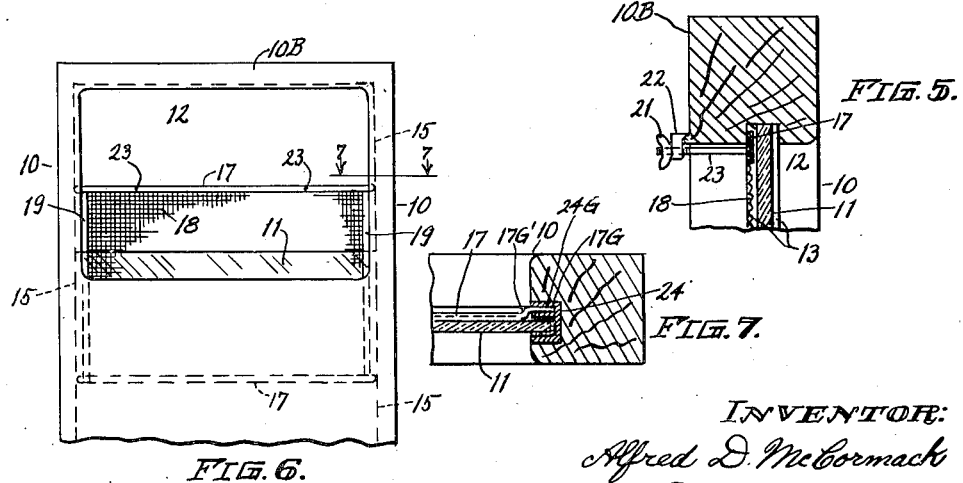
INVENTOR:
Alfred D. McCormack
BY David E. Carlsen.
ATTORNEY.

Patented Apr. 8, 1930

1,753,866

UNITED STATES PATENT OFFICE

ALFRED D. McCORMACK, OF MANKATO, MINNESOTA

SCREEN FOR MOTOR VEHICLES

Application filed May 31, 1928. Serial No. 282,010.

My invention relates to screen sash of the class particularly adaptable for use in motor vehicles, but also applicable to railway coaches or windows in any structure having a vertically adjustable window glass.

The main object is to provide a simple, efficient and inexpensive screen and frame therefor of such construction as to be readily insertible or removable from a window opening and means for mounting same in structures of the various kinds above specified.

In the accompanying drawing—

Fig. 1 is a face view of a preferred form of my improved screen sash.

Fig. 2 is an inside elevation of the screen sash shown in Fig. 1 mounted in the upper part of a window opening in a motor vehicle and including the vertically adjustable glass and adjacent frame construction of a motor vehicle.

Fig. 3 is an enlarged sectional detail about as on line 3—3 in Fig. 2 and Fig. 4 is an enlarged corner detail of the screen sash shown in Fig. 1.

Fig. 5 is an enlarged cross sectional view as on line 5—5 in Fig. 2, showing certain screen securing means.

Fig. 6 is a modification of Fig. 2 in reduced scale.

Fig. 7 is an enlarged sectional view as on line 7—7 in Fig. 6.

Referring to the drawing by reference numerals 10 designates either a motor-car door or a window frame in a wall of such car or other structure and in which is vertically movable a glass pane 11 into or out of the window-opening 12. The opposite vertical edges of the glass 11 are guided within a suitable padding 13 usually of U-shape in cross section and fixed as with nails 14 in the grooved part 15 of the upright side members of the window frame (see Fig. 3).

In motor cars the window glass 11 is usually raised or lowered by means of a crank 16 (see Fig. 2) operating various kinds of mechanical means (not shown) to move the glass up or down as desired, said crank being below the window opening in accessible position for occupants of the vehicle.

My improved device was designed for the purpose of admitting fresh air to circulate through a car without admitting insects and also keeping out rain when a fine mesh screen is used. The screen comprises a quadrangular metal sash with like upper and lower horizontal bars 17 each consisting of a single piece of flat metal folded or two pieces riveted together, to clamp the corresponding upper and lower edge parts of a suitable screen 18. 19 are opposite vertical end bars the opposite ends of each of which are suitably fixed to the bars 17 as at 20 (see Figs. 1 and 4). The bars 17 project outwardly beyond the bars 19 and form guide pieces 17G made comparatively thin and preferably rounded as shown, said guide pieces being insertible between the padding strips 13 and their adjacent groove walls 15 (see Fig. 3). If necessary the said guides 17G may be offset as shown at 17G' in Figs. 3 and 7 to cause the main frame and screen to set in a vertical plane in the window opening and close to the glass 11 or on contact with it. Thus it will be readily seen that in my device as made long and narrow (see Figs. 1 and 2) the screen is slipped into place in the upper part of the window opening and subsequently the glass is raised up to or alongside of the lower bar 17 and left in that position. Two or more window openings thus equipped provide ample circulation of air in a car and keeps out insects, a feature which is invaluable for tourists who sleep in their cars. Other advantages such as leaving a car unattended but with these means for air circulation are readily apparent.

It is preferred to make my device with the bars 17 of stiff but yieldable metal so that the device may be bowed to decrease its length and allow it to spring into normal straight plane when the guides 17G are in proper position. The guide pieces 17G may be omitted in which case the bars 19 are guided in the grooves 15. It is further obvious that when the narrow type of my device is not in use it may be slid down in plane parallel to the glass and below the window opening, but should of course be limited as to downward movement so it can readily be reached and raised again where so desired.

To further insure that my device will remain in its operative position, I provide a number of fixed inwardly directed studs 23 in the upper bar 17 said studs being provided each with a suitable threaded nut 21 or equivalent means for pressing a friction clip 22, of suitable form and bored to slide on the stud, against the inner and lower edge part of the upper window frame bar, as 10B, in Fig. 5. This insures a solid mounting of the screen when up, and when the screen is released and let down, these studs 23 simply rest on the inner window ledge as indicated at the places marked 23X in Fig. 2.

In Figs. 6 and 7 the screen is full size, that is, it is of such size as to cover the entire window opening, and being otherwise of the same principle and construction as in the other figures of the drawing. This form of the screen is of course only provided where the wall construction, window frame and glass raising means are such as to permit a full size screen being slipped down or up, freely. In this case it is preferred to provide special grooves 24G parallel to the grooves in which the glass rides (see particularly Fig. 7) and said groove 24G may be in a vertical rail 24 suitably fixed in the upright side members of the window frame. It is obvious also that the guide pieces 17G may be omitted from the frame and in this case the end pieces 19 are guided therein (not shown).

I claim:

In a screen sash for structures having a window opening and a pane movable in vertical window grooves into said opening; said sash comprising a quadrangular screen holding metal frame the top and bottom frame members being resilient and projecting beyond and offset from the vertical members to form guide members adapted to frictionally engage in the window frame grooves and slidable longitudinally therein and close to the pane, said top and bottom members of the screen sash comprising each a metal strip folded longitudinally to clamp the screen therein; said end members comprising plain bars and suitably attached to the corresponding edges of the screen.

In testimony whereof I affix my signature.

ALFRED D. McCORMACK.